United States Patent [19]
Greenwood

[11] Patent Number: 5,175,967
[45] Date of Patent: Jan. 5, 1993

[54] NATURAL LIGHT DISTRIBUTING APPARATUS

[76] Inventor: Harlow Greenwood, 13418 Forest Lake Dr., St. Louis, Mo. 63141

[21] Appl. No.: 694,772

[22] Filed: May 2, 1991

[51] Int. Cl.⁵ .............................................. E04B 7/18
[52] U.S. Cl. ....................................... 52/200; 52/28; 52/22; 52/31; 52/201; 126/617
[58] Field of Search .................... 52/200, 22, 28, 201, 52/171, 18, 27, 29, 31; 126/430, 425, 419

[56] References Cited

U.S. PATENT DOCUMENTS

| | | | |
|---|---|---|---|
| 4,335,547 | 6/1982 | Maxwell | 52/29 X |
| 4,559,925 | 12/1985 | Snow | 126/430 |
| 4,593,498 | 6/1986 | Stauss et al. | 52/18 X |
| 4,762,160 | 8/1988 | Bechtold et al. | 52/200 X |
| 4,791,533 | 12/1988 | Hane | 126/425 X |
| 4,816,723 | 2/1980 | Coppola et al. | 52/200 X |
| 4,827,682 | 5/1989 | Gildehaus | 52/201 |
| 4,833,838 | 5/1989 | Van Dame | 52/22 |
| 5,027,566 | 7/1991 | Gilowski | 52/200 X |

FOREIGN PATENT DOCUMENTS 2328292 1/1975 Fed. Rep. of Germany ........ 52/200

Primary Examiner—David A. Scherbel
Assistant Examiner—Kien Nguyen
Attorney, Agent, or Firm—Leon Gilden

[57] ABSTRACT

An elongate conduit directed from within a dwelling to position through a roof of the dwelling includes a mirrored interior surface, with its upper terminal end oriented orthogonally relative to the conduit, and a lower terminal end including a window portion directed through a forward wall of the conduit arranged substantially parallel to an axis of the conduit, with the mirror mounted to a lower terminal end of the conduit oriented at a relative forty-five degree relationship relative to the axis of the conduit to project light through the window. The conduit includes a mirrored surface therethrough. The invention further includes a transparent dome mounted over the upper terminal end of the conduit, and includes a rain trough positioned about a perimeter of the dome, with the rain trough including apertures directed therethrough.

2 Claims, 4 Drawing Sheets

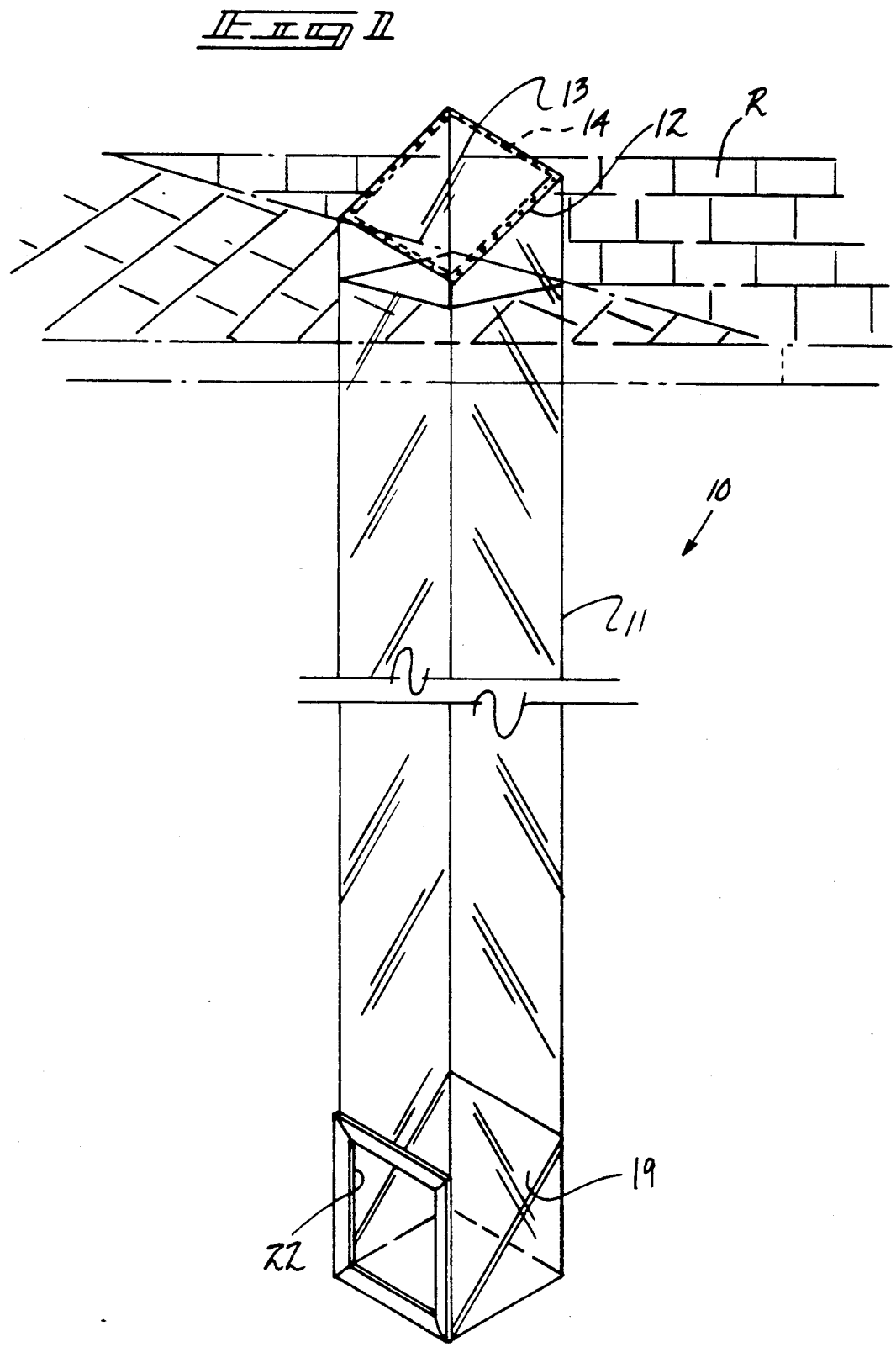

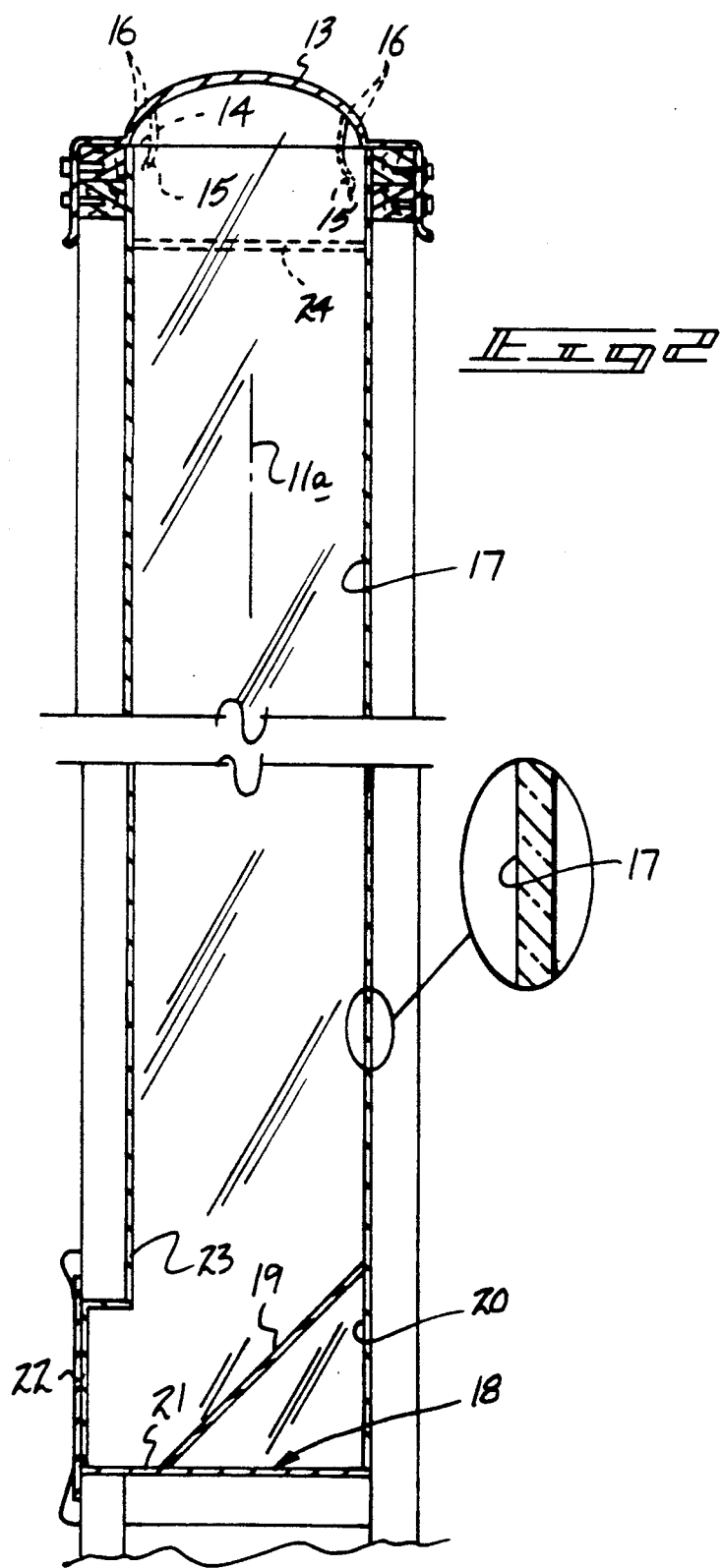

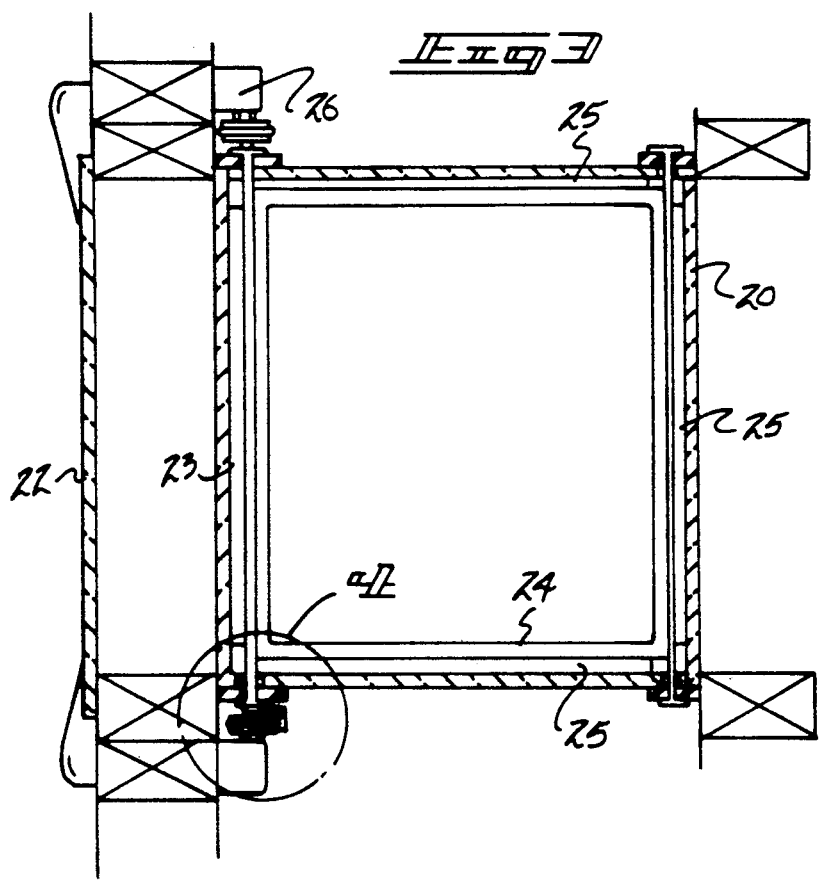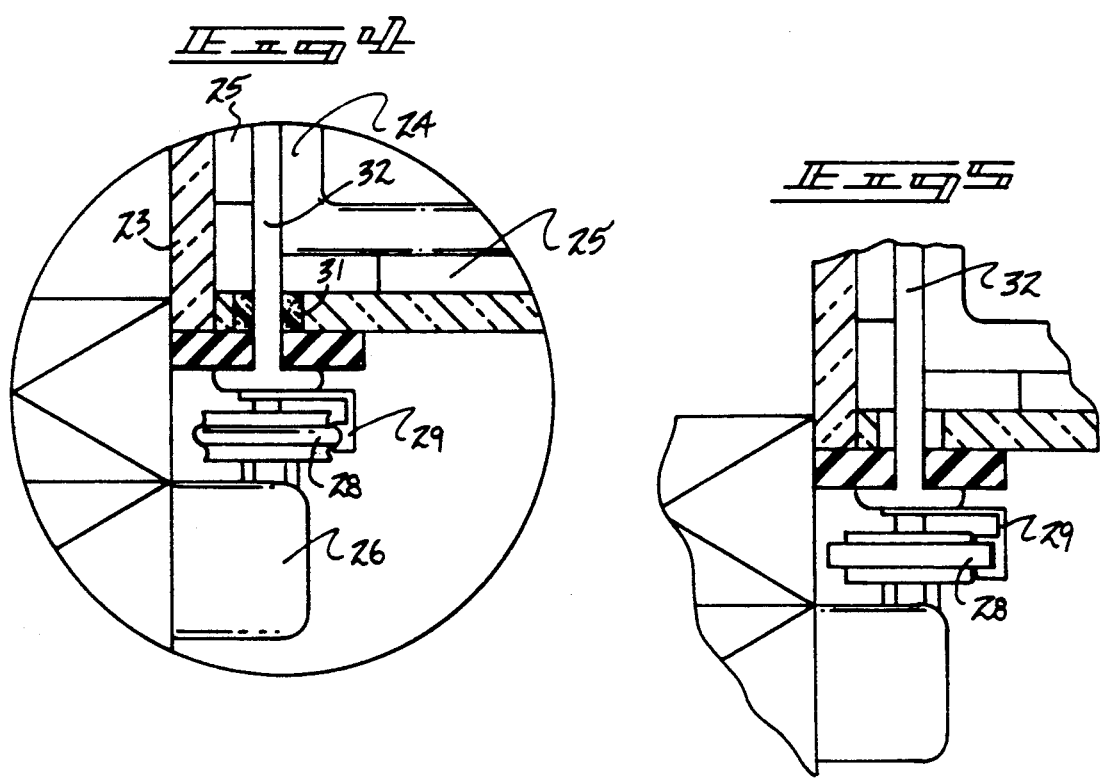

POSITION SWITCH

NATURAL LIGHT DISTRIBUTING APPARATUS

BACKGROUND OF THE INVENTION

1. Field of the Invention

The field of invention relates to natural light apparatus, and more particularly pertains to a new and improved natural light distributing apparatus to direct natural light from exteriorly of a dwelling to an interior portion thereof.

2. Description of the Prior Art

Various natural light distributing apparatus is utilized in the prior art to project natural light exteriorly of a dwelling to an interior portion of the dwelling. Such organizations are utilized to enhance comfort and convenience within a dwelling where normal windows are not available and to enhance natural light introduction into the dwelling. Examples of the prior art include U.S. Pat. No. 4,791,533 to Hane wherein a natural lighting apparatus includes a mirror for reflecting light, with the mirror supported for rotation about an axis for maximizing light relative to the apparatus.

U.S. Pat. No. 4,559,925 to Snow sets forth a solar collector assembly utilized to heat an interior of an enclosed structure. Shading structure is provided to control light relative to the apparatus.

U.S. Pat. No. 4,706,649 to Hager sets forth a further example of an apparatus to direct light interiorly of a dwelling utilizing mirrored surfaces.

U.S. Pat. No. 3,246,564 to Chieffe illustrates the use of a protected lighting organization to direct natural light interiorly of an underground dwelling utilizing a mirrored reflective surface positioned at a lower terminal end of the conduit structure of the organization.

Accordingly, it may be appreciated that there continues to be a need for a new and improved natural light distributing apparatus as set forth by the instant invention which addresses both the problems of ease of use as well as effectiveness in construction for projecting light interiorly of a dwelling utilizing mirrored surfaces directed therethrough and in this respect, the present invention substantially fulfills this need.

SUMMARY OF THE INVENTION

In view of the foregoing disadvantages inherent in the known types of natural light distributing apparatus now present in the prior art, the present invention provides a natural light distributing apparatus wherein the same utilizes a conduit mounting a mirrored interior surface coextensive with the conduit, as well as a mirror positioned at a relative forty-five degree angle at a lower terminal end of the conduit for directing light interiorly of a dwelling formed as a single conduit structure along a central axis. As such, the general purpose of the present invention, which will be described subsequently in greater detail, is to provide a new and improved natural light distributing apparatus which has all the advantages of the prior art natural light distributing apparatus and none of the disadvantages.

To attain this, the present invention provides an elongate conduit directed from within a dwelling to position through a roof of the dwelling including a mirrored interior surface, with its upper terminal end oriented orthogonally relative to the conduit, and a lower terminal end including a window portion directed through a forward wall of the conduit arranged substantially parallel to an axis of the conduit, with the mirror mounted to a lower terminal end of the conduit oriented at a relative forty-five degree relationship relative to the axis of the conduit to project light through the window. The conduit includes a mirrored surface therethrough. The invention further includes a transparent dome mounted over the upper terminal end of the conduit, and includes a rain trough positioned about a perimeter of the dome, with the rain trough including apertures therethrough. The apertures are positioned overlying respective water absorbent pads mounted within a rectangular framework, wherein the framework is arranged for reciprocation within the conduit for periodic cleaning of the conduit and the mirrored surface thereof.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to anable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved natural light distributing apparatus which has all the advantages of the prior art natural light distributing apparatus and none of the disadvantages.

It is another object of the present invention to provide a new and improved natural light distributing apparatus which may be easily and efficiently manufactured and marketed.

It is a further object of the present invention to provide a new and improved natural light distributing apparatus which is of a durable and reliable construction.

An even further object of the present invention is to provide a new and improved natural light distributing apparatus which is susceptible of a low cost of manufacture with regard to both materials and labor, and which accordingly is then susceptible of low prices of sale to the consuming public, thereby making such natural light distributing apparatus economically available to the buying public.

Still yet another object of the present invention is to provide a new and improved natural light distributing apparatus which provides in the apparatuses and methods of the prior art some of the advantages thereof. while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic cross-sectional illustration of the instant invention illustrating a rectilinearly mounted framework positioned under a cover dome for periodic cleaning of the organization.

FIG. 3 is an orthographic top view of the rectilinear cleaning framework of the invention.

FIG. 4 is an enlarged view of FIG. 4 as set forth in FIG. 3.

FIG. 5 is a further example of the organization as set forth in FIG. 4 operative without a guide bushing mounted relative to the conduit structure.

DESCRIPTION OF THE PREFERRED EMBODIMENT

Figure 6:
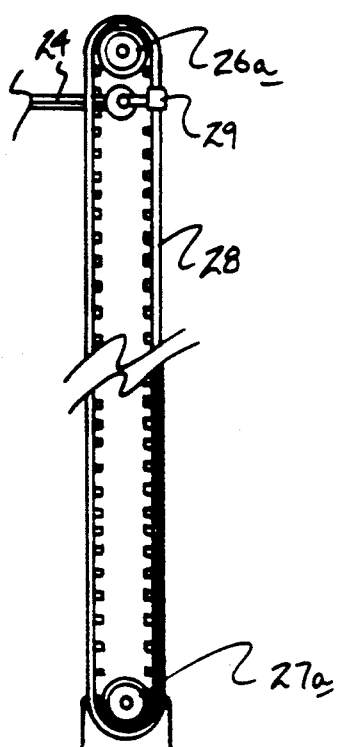
FIG. 6 is an orthographic illustration of the drive mechanism for the rectilinear framework utilized by the invention.
Figure 7:
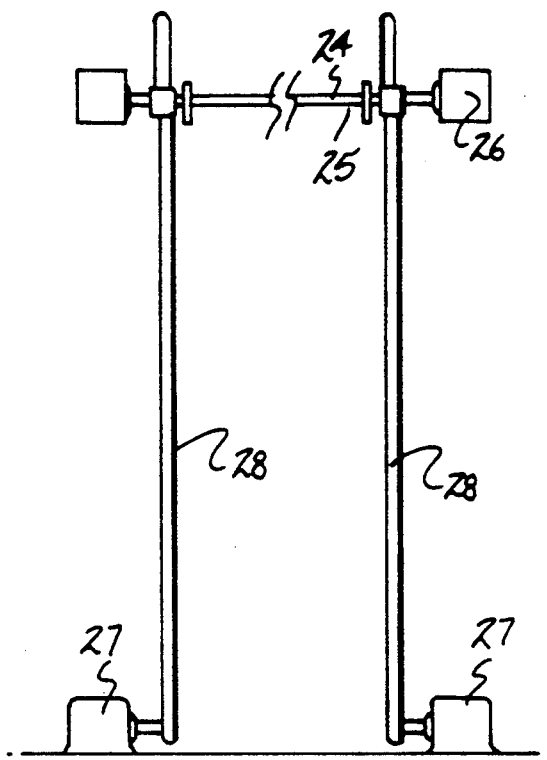
FIG. 7 is an orthographic side view of the organization, as set forth in FIG. 6.

With reference now to the drawings, and in particular to FIGS. 1 to 8 thereof, a new and improved natural light distributing apparatus embodying the principles and concepts of the present invention and generally designated by the reference numeral 10 will be described.

More specifically, the natural light distributing apparatus 10 of the instant invention essentially comprises an elongate parallelepiped light conduit 11 defined along a conduit axis 11a. The conduit 11 projects through a roof "R" at an upper terminal end 12 of the conduit, with the upper terminal end 12 defining a plane orthogonally oriented relative to the conduit axis 11a, with a cover dome 13 mounted over the upper terminal conduit end 12. A rain channel 14 (see FIGS. 1 and 2) including a plurality of rain channel drip apertures 15 directed therethrough are mounted about a perimeter of the dome 13. Dome apertures 16 are positioned above the rain channel drip apertures 15 about a perimeter portion of the dome to direct rain water through the drip apertures 15 from the dome apertures 16 to underlying fluid absorbent elongate pads 25 mounted within a rectilinear framework 24, in a manner to be discussed in more detail below. The conduit 11 is formed with a mirrored interior conduit surface 17 coextensive with the conduit to enhance reflective light throughout the conduit, with the conduit including a conduit lower terminal end 18 defined by a conduit floor 21 that is orthogonally oriented relative to the conduit axis 11a, with a mirror plate 19 oriented at a forty-five degree angle relative to the conduit floor 21, and a conduit rear wall 20 that is spaced from and parallel a conduit forward wall 23. A conduit transparent window 22 is mounted through the conduit forward wall 23 at the lower terminal end of the forward wall adjacent the floor 21 and oriented generally parallel to the conduit axis 11a to direct reflective light throughout the conduit and mirror plate 19 through the window 22 into an interior portion of a dwelling, as depicted in FIG. 1.

Figure 8:
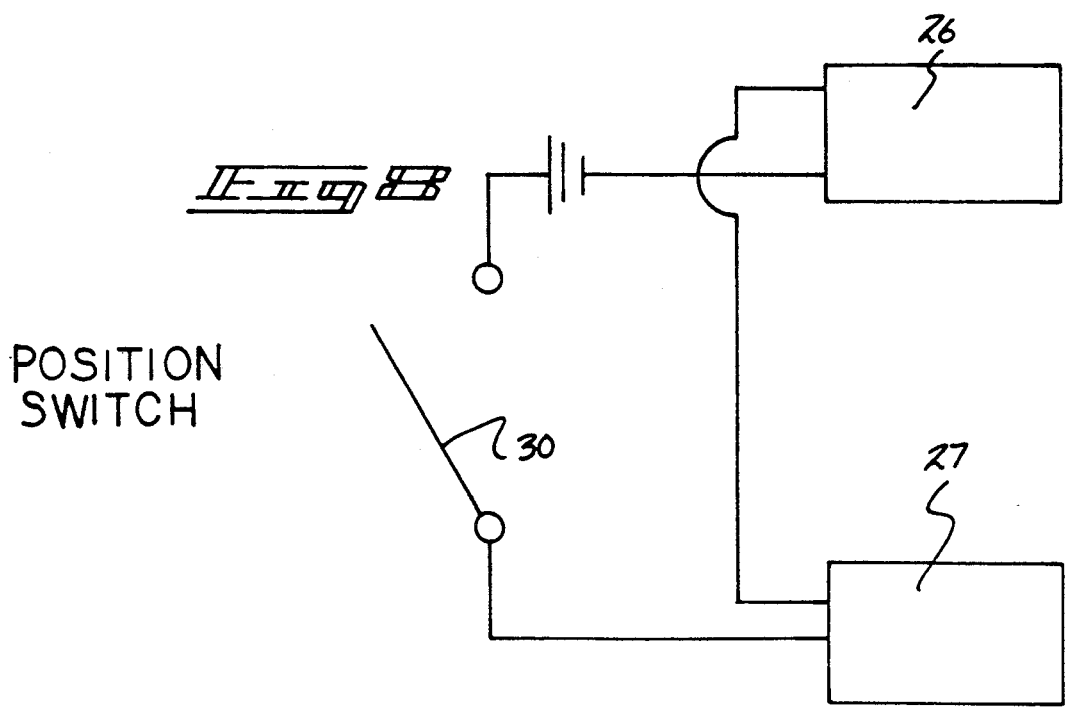
FIG. 8 is a diagrammatic illustration of circuitry available for use by the instant invention.

The rectilinear framework 24, as discussed above, includes fluid absorbent elongate pads 25 that are mounted to each frame leg of the framework 24 to an exterior surface of each frame leg in communication with an interior surface of the conduit 11. Reciprocation of the framework permits periodic cleaning of the mirrored interior surface 17. To effect this periodic cleaning, an upper drive motor 26 cooperates with a lower drive motor 27, wherein each upper and lower drive motor includes respective upper and lower drive motor pulleys 26a and 27a, with the framework including a framework first link 29 that is fixedly mounted to the endless drive band 28 mounted to the upper and lower drive pulleys 26a and 27a. The first link 29 is mounted to a framework second link 32 in orthogonal relationship, wherein the framework second link is directed through a forward frame leg of the rectilinear framework 17. If desired, a conduit guide bushing 31 is directed coextensive with a side wall of the conduit to enhance alignment of the conduit in its reciprocation during a cleaning procedure. Reference to FIG. 8 illustrates the use of an on/off switch 30 to direct electrical energy to the upper and lower drive motors 26 and 27.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A natural light distributing apparatus comprising, a dwelling structure including a roof, and
a parallel light conduit defined about a central conduit axis directed through the roof, with an upper terminal conduit end of the conduit projecting above the roof, wherein the upper terminal end is oriented orthogonally relative to the conduit axis, and the conduit including a conduit lower terminal end, wherein the conduit lower terminal end is orthogonally oriented relative to the conduit axis, and the conduit including a conduit floor formed to the lower terminal end of the conduit, and the conduit including a conduit rear wall and a conduit forward wall, the conduit forward wall including a transparent window, wherein the transparent window is directed through the forward wall adjacent the conduit lower terminal end, and a mirror plate is mounted to the conduit rear wall and the conduit floor oriented at an included forty-five degree angle between a rear surface of the mirrored plate and the conduit floor, and the conduit includes an interior surface, the interior surface is of a reflective mirror construction, and the conduit upper terminal end includes a conduit dome mounted coextensively to the upper terminal end, and the conduit dome includes a rain channel formed to a perimeter of the dome, wherein the rain channel projects below the dome, and wherein the rain channel includes a series of drip apertures directed through the rain channel, and a rectilinear framework mounted within the conduit reciprocatably mounted to the conduit and displaceable from a first position adjacent the rain channel to a second position adjacent the mirror plate, and the rectilinear framework includes a framework leg mounted adjacent each wall of the conduit, wherein a fluid absorbent elongate pad is mounted between each framework leg in a respective wall of the conduit, and each pad is positioned below the drip apertures of the rain channel.

2. An apparatus as set forth in claim 1 wherein the rectilinear framework includes a first link, the first link is orthogonally mounted to a second link, wherein the second link is directed along one of the framework legs, and further including a lower motor mounted adjacent the second position, and an upper motor mounted adjacent the first position, and including an endless drive band mounted between the upper motor and the lower motor, and the first link is mounted to the drive band to effect reciprocation of the rectilinear framework upon actuation of the lower motor and the upper motor.

* * * * *